US009563247B2

United States Patent
Chou et al.

(10) Patent No.: US 9,563,247 B2
(45) Date of Patent: Feb. 7, 2017

(54) PORTABLE ELECTRONIC SYSTEM AND POWER MANAGEMENT METHOD THEREOF

(71) Applicant: Wistron Corporation, New Taipei (TW)

(72) Inventors: Che-Ming Chou, New Taipei (TW); Tung-Shan Lin, New Taipei (TW); Szu-Wei Pan, New Taipei (TW)

(73) Assignee: Wistron Corporation, New Taipei (TW)

( * ) Notice: Subject to any disclaimer, the term of this patent is extended or adjusted under 35 U.S.C. 154(b) by 310 days.

(21) Appl. No.: 14/078,526

(22) Filed: Nov. 13, 2013

(65) Prior Publication Data

US 2014/0344588 A1    Nov. 20, 2014

(30) Foreign Application Priority Data

May 14, 2013 (TW) .............................. 102117027 A (51) Int. Cl.
*G06F 1/00* (2006.01)
*G06F 1/30* (2006.01)
(Continued)

(52) U.S. Cl.
CPC .................. *G06F 1/30* (2013.01); *G06F 1/263* (2013.01); *G06F 11/2015* (2013.01);
(Continued)

(58) Field of Classification Search
CPC  H02J 7/0054; H02J 7/0013; H02J 2007/0067; H02J 7/1423; H02J 2007/0098; H01M 10/44; H01M 2220/30; G06F 1/263; G06F 11/2015
See application file for complete search history.

(56) References Cited

U.S. PATENT DOCUMENTS

2002/0011823 A1\* 1/2002 Lee ...................... G06F 1/1632
320/137
2008/0172566 A1    7/2008 Park
(Continued)

FOREIGN PATENT DOCUMENTS

TW    I289368       11/2007
TW    201240190    10/2012

OTHER PUBLICATIONS

"Office Action of Taiwan Counterpart Application", issued on Sep. 26, 2014, with English translation thereof, p. 1-p. 13.
(Continued)

*Primary Examiner* — Xuxing Chen
(74) *Attorney, Agent, or Firm* — Jianq Chyun IP Office (57) ABSTRACT

A portable electronic system and power management method thereof are disclosed. The portable electronic system includes a portable host and a portable power supply. The portable host has a main battery and a connecting interface. The portable power supply has a backup battery, and is coupled to the portable host through the connecting interface, and transceives a work state of the portable host and the portable power supply and a system power provided by the portable host through the connecting interface. The portable host and the portable power supply control charge or discharge states of the main battery and the backup battery according to the work state. The work state includes relative state of charges (RSOC) of the main and backup battery and information of whether the portable host is coupled to a power adaptor for receiving an external power.

22 Claims, 6 Drawing Sheets

(51) Int. Cl.
  *H02J 7/00*       (2006.01)
  *G06F 1/26*       (2006.01)
  *G06F 11/20*      (2006.01)
  *H01M 10/44*      (2006.01)
  *H02J 7/14*       (2006.01)

(52) U.S. Cl.
  CPC ........ *H01M 10/44* (2013.01); *H01M 2220/30* (2013.01); *H02J 7/0013* (2013.01); *H02J 7/0054* (2013.01); *H02J 7/1423* (2013.01); *H02J 2007/0067* (2013.01); *H02J 2007/0098* (2013.01)

(56) References Cited

U.S. PATENT DOCUMENTS

2012/0126820 A1*  5/2012  Tan ................ H02J 7/0013
                                          324/434
2012/0242281 A1   9/2012  Liu
2014/0181547 A1*  6/2014  Hua ................ G06F 1/3206
                                          713/320

OTHER PUBLICATIONS

Office Action of China Counterpart Application, issued on Dec. 9, 2015, with English translation thereof, p. 1-p. 28.

* cited by examiner

PORTABLE ELECTRONIC SYSTEM AND POWER MANAGEMENT METHOD THEREOF

CROSS-REFERENCE TO RELATED APPLICATION

This application claims the priority benefit of Taiwan application serial no. 102117027, filed on May 14, 2013. The entirety of the above-mentioned patent application is hereby incorporated by reference herein and made a part of this specification.

BACKGROUND

Technical Field

The invention relates to a portable electronic system. Particularly, the invention relates to a power management method of a portable electronic system.

Related Art

Along with development of electronic technology and increasing demand of information, portable electronic devices become indispensable tools in people's daily life.

In today's technical field, along with increasing demand on functions of the portable electronic device, demands on data and graphics computation of the portable electronic device are also greatly increased, which causes increase of power consumption of the portable electronic device. Therefore, in order to enhance the endurance of the portable electronic device, it is necessary to equip a battery with sufficient power, for example, to equip a dual battery pack in the portable electronic device. However, as the dual battery pack is equipped in the portable electronic device, a weight and cost of the portable electronic device are increased, which decreases product competitiveness thereof

SUMMARY

The invention is directed to a portable electronic system and a power management method, by which a working endurance of a portable host thereof is effectively enhanced.

The invention provides a portable electronic system including a portable host and a portable power supply. The portable host has a main battery and a connecting interface. The portable power supply has a backup battery, and is coupled to the portable host through the connecting interface, and transceives a work state of the portable host and the portable power supply and a system power provided by the portable host through the connecting interface. The portable host and the portable power supply control charge or discharge states of the main battery and the backup battery according to the work state. The work state includes relative state of charges (RSOC) of the main battery and the backup battery and information of whether the portable host is coupled to a power adaptor for receiving an external power.

The invention provides a power management method adapted to a portable electronic system. The power management method includes following steps. A work state of a portable host and a portable power supply is transceived through a connecting interface, where the portable host has a main battery, and the portable power supply has a backup battery. Charge or discharge states of the main battery and the backup battery are controlled according to the work state, where the work state includes RSOC of the main battery and the backup battery and information of whether the portable host is coupled to a power adaptor for receiving an external power.

According to the above descriptions, the main battery and the backup battery in the portable host and the portable power supply perform adaptive charge or discharge operations according to the work state of the portable electronic system. In this way, power management and application of the main battery and the backup battery are more flexible, which effectively enhances the endurance of the portable electronic system.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
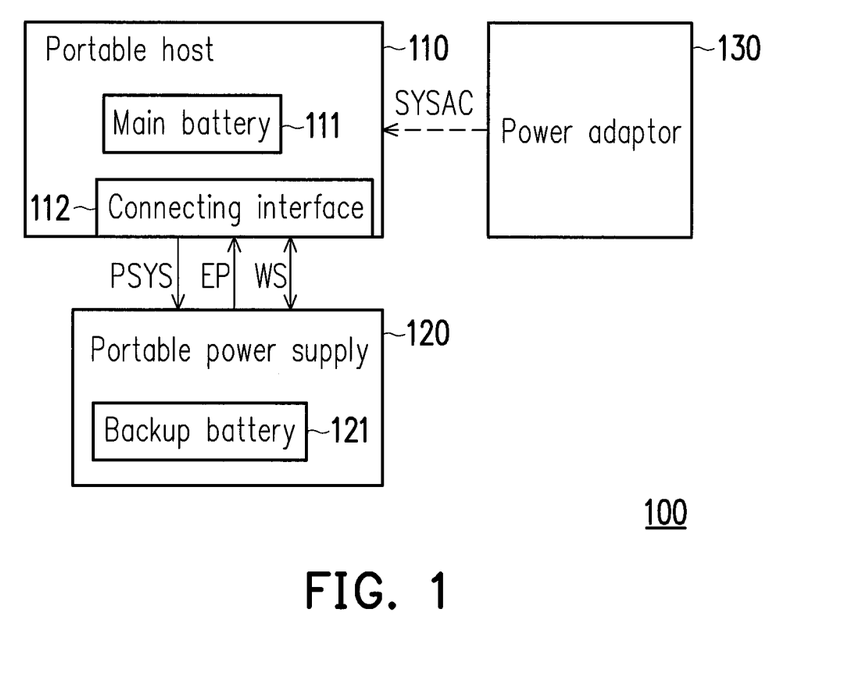
FIG. 1 is a schematic diagram of a portable electronic system 100 according to an embodiment of the invention.

Referring to FIG. 1, FIG. 1 is a schematic diagram of a portable electronic system 100 according to an embodiment of the invention. The portable electronic system 100 includes a portable host 110 and a portable power supply 120. The portable host 110 has a main battery 111 and a connecting interface 112. The portable power supply 120 has a backup battery 121. The portable power supply 120 is coupled to the portable host 110 through the connecting interface 112. The portable power supply 120 transceives a work state WS of the portable host 110 and the portable power supply 120 and a system power PSYS provided by the portable host 110 through the connecting interface 112. The portable host 110 and the portable power supply 120 control charge or discharge states of the main battery 111 and the backup battery 121 according to the work state WS.

In the present embodiment, the work state WS includes relative state of charges (RSOC) of the main battery 111 and the backup battery 121 and information of whether the portable host 110 is coupled to a power adaptor 130 for receiving an external power SYSAC or not.

In other embodiments, the work state WS may further include information of whether the portable host 110 is in a non-off mode or an off mode and whether the portable electronic system 100 sets the main battery 110 and the backup battery 121 to synchronously charge or discharge.

Figure 2A:
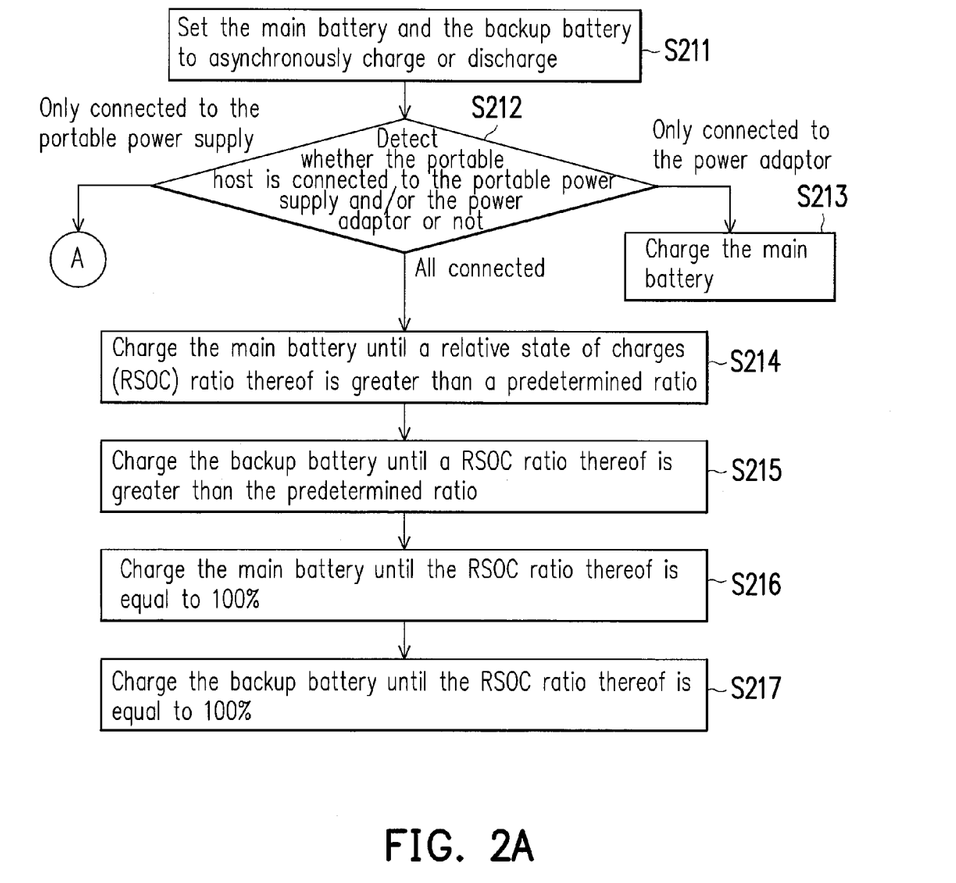
FIG. 2A is a flowchart illustrating a power management method of the portable electronic system 100 according to an embodiment of the invention.

Referring to FIG. 1 and FIG. 2A, FIG. 2A is a flowchart illustrating a power management method of the portable electronic system 100 according to an embodiment of the invention. In step S211, the portable host 110 sets the main battery 111 and the backup battery 121 of the portable electronic system 100 to asynchronously charge or discharge. In step S212, it is detected whether the portable host 110 and the portable power supply 120 are connected or not, and whether the portable host 110 and the power adaptor 130 are connected or not. The above detection can be executed by the portable host 110. In case that the portable host 110 and the portable power supply 120 are connected, the portable host 110 can notify its work state WS indicating information of whether the portable host 110 is connected to the power adaptor 130 to the portable power supply 120 through the connecting interface 112.

In the step S212, when it is detected that the portable host 110 is not connected to the portable power supply 120 but is only connected to the power adaptor 130, a step S213 is executed, by which the external power SYSAC provided by the power adaptor 130 is used to charge the main battery 111. On the other hand, if the portable host 110 is neither connected to the portable power supply 120 nor connected to the power adaptor 130, the main battery 111 discharges to supply power to the portable host 110.

In the step S212, when it is detected that the portable host 110 is connected to both of the portable power supply 120 and the power adaptor 130, steps S214, S215, S216 and S217 are executed. In the step S214, when a RSOC ratio of the main battery 111 is not greater than a predetermined ratio, the main battery 111 is charged until the RSOC ratio of the main battery 111 is greater than the predetermined ratio. The main battery 111 may be charged by the external power SYSAC provided by the power adaptor 130, or can be charged by a backup power EP provided by the backup battery 121 of the portable power supply 120. The above predetermined ratio may be set by a designer in advance, and in the present embodiment, the predetermined ratio is, for example, 80%.

After the RSOC ratio is greater than the predetermined ratio, the step S215 is executed. In the step S215, if a RSOC ratio of the backup battery 121 is not greater than the predetermined ratio, the backup battery 121 is charged until the RSOC ratio of the backup battery 121 is increased to be greater than the predetermined ratio. The backup battery 121 may be charged by the external power SYSAC provided by the power adaptor 130, or the power adaptor 130 may receive another external backup power (not shown) from external, and converts the external backup power to charge the backup battery 121. The external backup power may be supplied by utility power, or supplied by other types of power supply.

When the RSOC ratios of the main battery 111 and the backup battery 121 are all greater than the predetermined ratio, the step S216 is executed, by which the main battery 111 is further charged to increase the RSOC ratio of the main battery 111 to 100%. After the main battery 111 is fully charged, the step S217 is executed, by which the backup battery 121 is further charged to increase the RSOC ratio of the backup battery 121 to 100%.

Figure 2B:
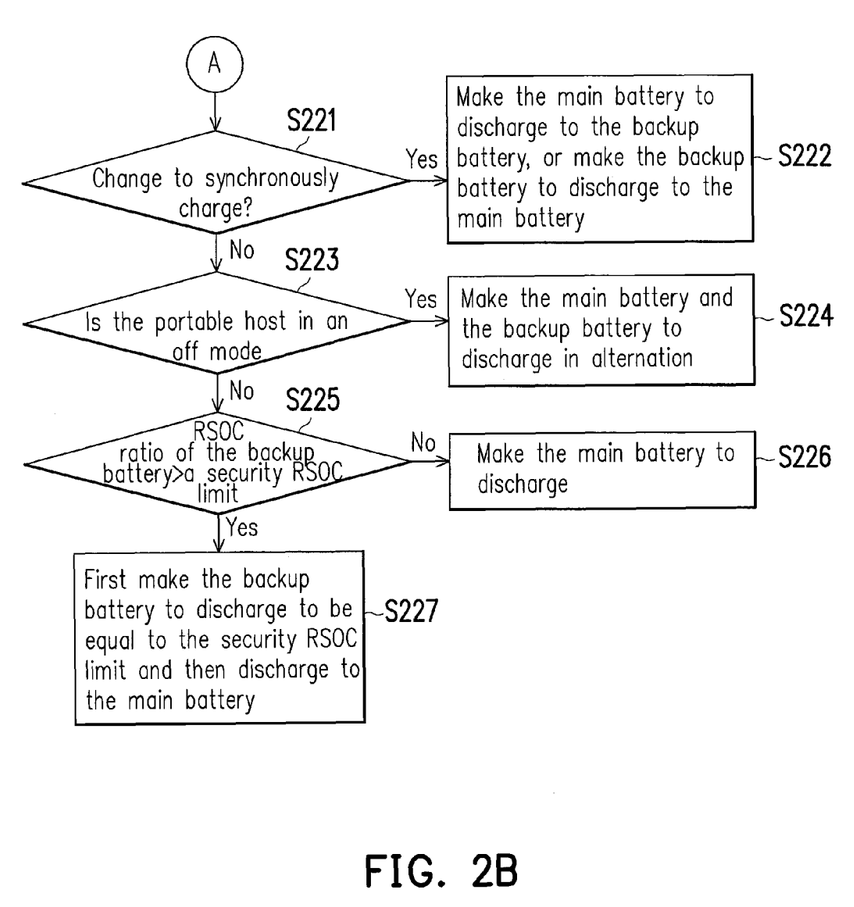
FIG. 2B is a flowchart illustrating a power management method of the portable electronic system 100 according to an embodiment of the invention.

Referring to FIG. 1, FIG. 2A and FIG. 2B, FIG. 2B is a flowchart illustrating a power management method of the portable electronic system 100 according to an embodiment of the invention. Nodes A of FIG. 2A and FIG. 2B are connected. When it is determined that the portable host 110 is only connected to the portable power supply 120 in the step S212, a step S221 is executed to detect whether the asynchronous charge or discharge of the main battery 111 and the backup battery 121 is changed to synchronous charge or discharge. If yes, a step S222 is executed to discharge the main battery 111 to the backup battery 121, or discharge the backup battery 121 to the main battery 111. If it is detected that the setting of asynchronous charge or discharge of the main battery 111 and the backup battery 121 is not changed in the step S221, a step S223 is executed to detect whether the portable host 110 is in the off mode.

If it is detected that the portable host 110 is in the off mode in the step S223, a step S224 is executed, by which the main battery 111 and the backup battery 121 discharge in alternation. If it is detected that the portable host 110 is not in the off mode in the step S223, a step S225 is executed to detect whether the RSOC ratio of the backup battery 121 is greater than a security RSOC limit.

The detecting operations of the steps S221 and S223 can be executed by the portable host 110. The detecting operation of the step S225 can be executed by the portable host 110 or a controller (not shown) in the portable power supply 120.

When it is detected that the RSOC ratio of the backup battery 121 is greater than the security RSOC limit in the step S225, the portable electronic system 100 first makes the backup battery 121 to discharge to supply power to circuit operations of the portable host 110 and the portable power supply 120, and when the RSOC ratio of the backup battery 121 drops to the security RSOC limit, the portable electronic system 100 makes the main battery 111 to discharge to supply power to circuit operations of the portable host 110 and the portable power supply 120 (step S226).

Figure 3A:
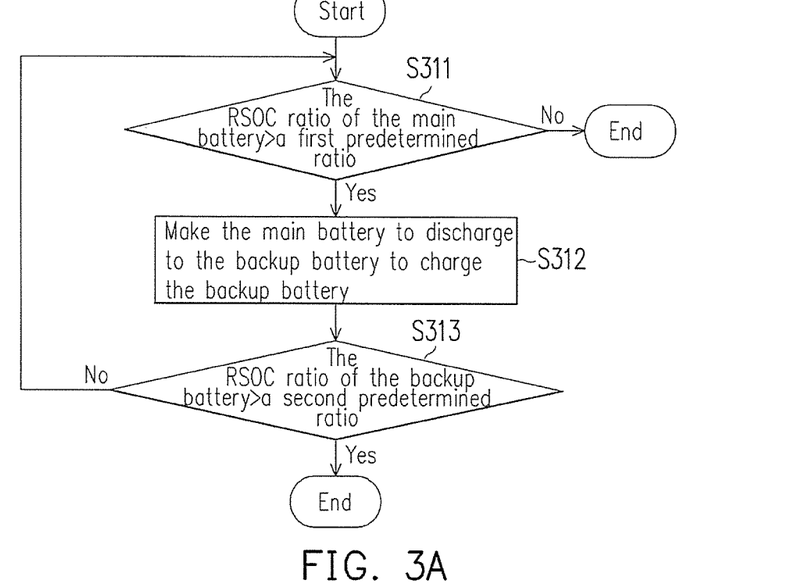
FIG. 3A and FIG. 3B are flowcharts illustrating multiple implementations of a step S222 according to an embodiment of the invention.
Figure 3B:
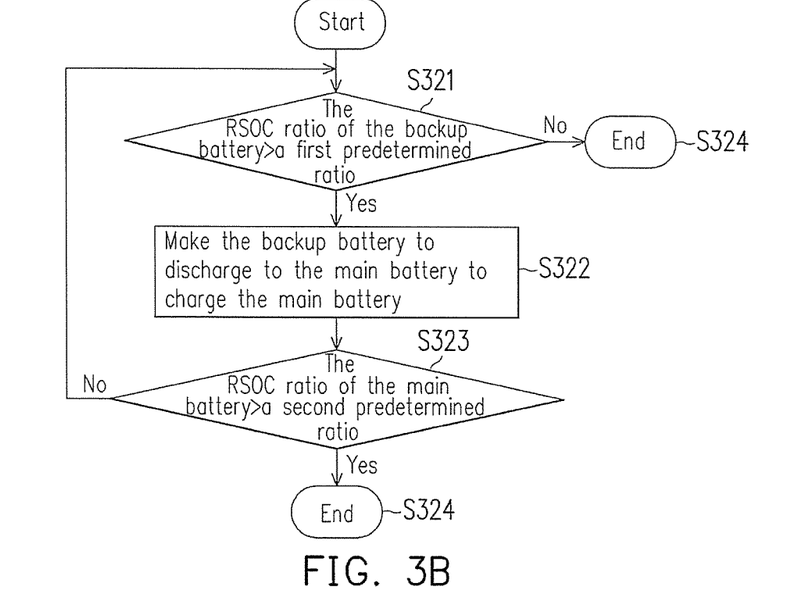

Referring to FIG. 3A and FIG. 3B, FIG. 3A and FIG. 3B are flowcharts illustrating multiple implementations of the step S222 according to an embodiment of the invention. Referring to FIG. 3A, in step S311, the portable electronic system 100 first detects whether the RSOC ratio of the main battery 111 is greater than the first predetermined ratio, and when the RSOC ratio of the main battery 111 is greater than the first predetermined ratio, a step S312 is executed, by which the main battery 111 discharges to the backup battery 121 to charge the backup battery 121. Then, in step S313, it is determined whether the RSOC ratio of the backup battery 121 is increased to be higher than a second predetermined ratio, and if the RSOC ratio of the backup battery 121 is increased to be higher than the second predetermined ratio, the flow is ended. Comparatively, if the RSOC ratio of the backup battery 121 is not increased to be higher than the second predetermined ratio, the flow returns to the step S311. Moreover, when it is determined that the RSOC ratio of the main battery 111 is not greater than the first predetermined value in the step S311, the flow is also ended.

The first predetermined value can be the same or different to the second predetermined value. In the present embodiment, the second predetermined ratio can be smaller than or equal to the first predetermined value.

Referring to FIG. 3B, in step S321, the portable electronic system 100 first detects whether the RSOC ratio of the backup battery 121 is greater than the first predetermined value, and when the RSOC ratio of the backup battery 121 is greater than the first predetermined value, a step S322 is executed, by which the backup battery 121 discharges to the main battery 111 to charge the main battery 111. Then, in step S323, it is determined whether the RSOC ratio of the main battery 111 is increased to be higher than a second predetermined ratio, and if the RSOC ratio of the main battery 111 is increased to be higher than the second pre-determined ratio, the flow is ended. Comparatively, if the RSOC ratio of the main battery 111 is not increased to be higher than the second predetermined ratio, the flow returns to the step S321. Moreover, when it is determined that the RSOC ratio of the backup battery 121 is not greater than the first predetermined value in the step S321, the flow is also ended.

It should be noticed that the portable host 110 may select the steps of FIG. 3A or FIG. 3B to implement the charge or discharge operations between the backup batteries 111 and 121. Such selection can be fixed or can be dynamically adjusted. Alternatively, the portable host 110 may perform the selection according to the RSOC ratios of the main battery 111 and the backup battery 121.

Figure 4:
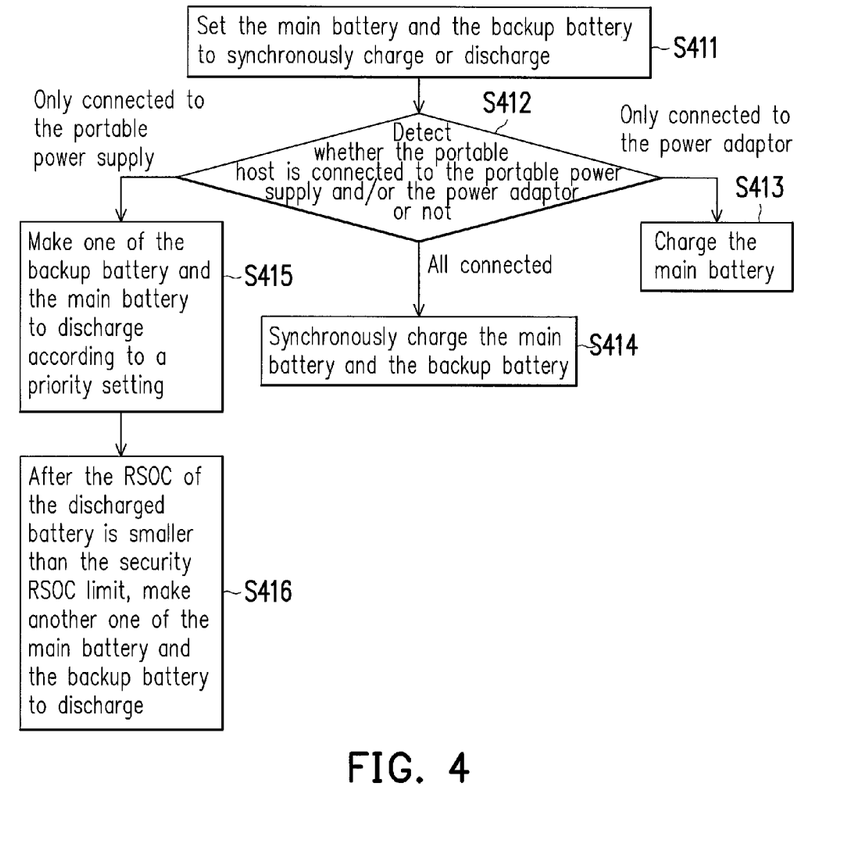
FIG. 4 is a flowchart illustrating a power management method of the portable electronic system 100 according to another embodiment of the invention.

Referring to FIG. 1 and FIG. 4, FIG. 4 is a flowchart illustrating a power management method of the portable electronic system 100 according to another embodiment of the invention. In step S411, the main battery 111 and the backup battery 121 are set to synchronously charge or discharge. In step S412, it is detected whether the portable host 110 and the portable power supply 120 are connected or not, and whether the portable host 110 and the power adapter 130 are connected or not. When it is detected that the portable host 110 and the portable power supply 120 are not connected, and only the portable host 110 and the power adapter 130 are connected in the step S412, a step S413 is executed, by which the external power SYSAC provided by the power adaptor 130 is used to charge the main battery 111. On the other hand, if the portable host 110 is neither connected to the portable power supply 120 nor connected to the power adaptor 130, the main battery 111 discharges to supply power to the portable host 110.

In the step S412, when it is detected that the portable host 110 is connected to both of the portable power supply 120 and the power adaptor 130, a step S414 is executed, by which the main battery 111 and the backup battery 121 synchronously discharge to supply power to circuit operations of the portable host 110 and the portable power supply 120. When it is detected that the portable host 110 is only connected to the portable power supply 120 in the step S412, a step S415 is executed, by which one of the backup battery 121 and the main battery 111 is selected in priority to discharge to supply power to circuit operations of the portable host 110 and the portable power supply 120. Moreover, after the RSOC of the battery selected for discharging is smaller than the security RSOC limit, the other battery is selected to discharge to supply power to circuit operations of the portable host 110 and the portable power supply 120.

For example, in the step S415, the portable electronic system 100 selects the backup battery 121 in priority to discharge, and the discharge operation is continued until the RSOC of the backup battery 121 is smaller than the security RSOC limit. Then, the portable electronic system 100 selects the main battery 111 to discharge, so as to supply power to circuit operations of the portable host 110.

Figure 5:
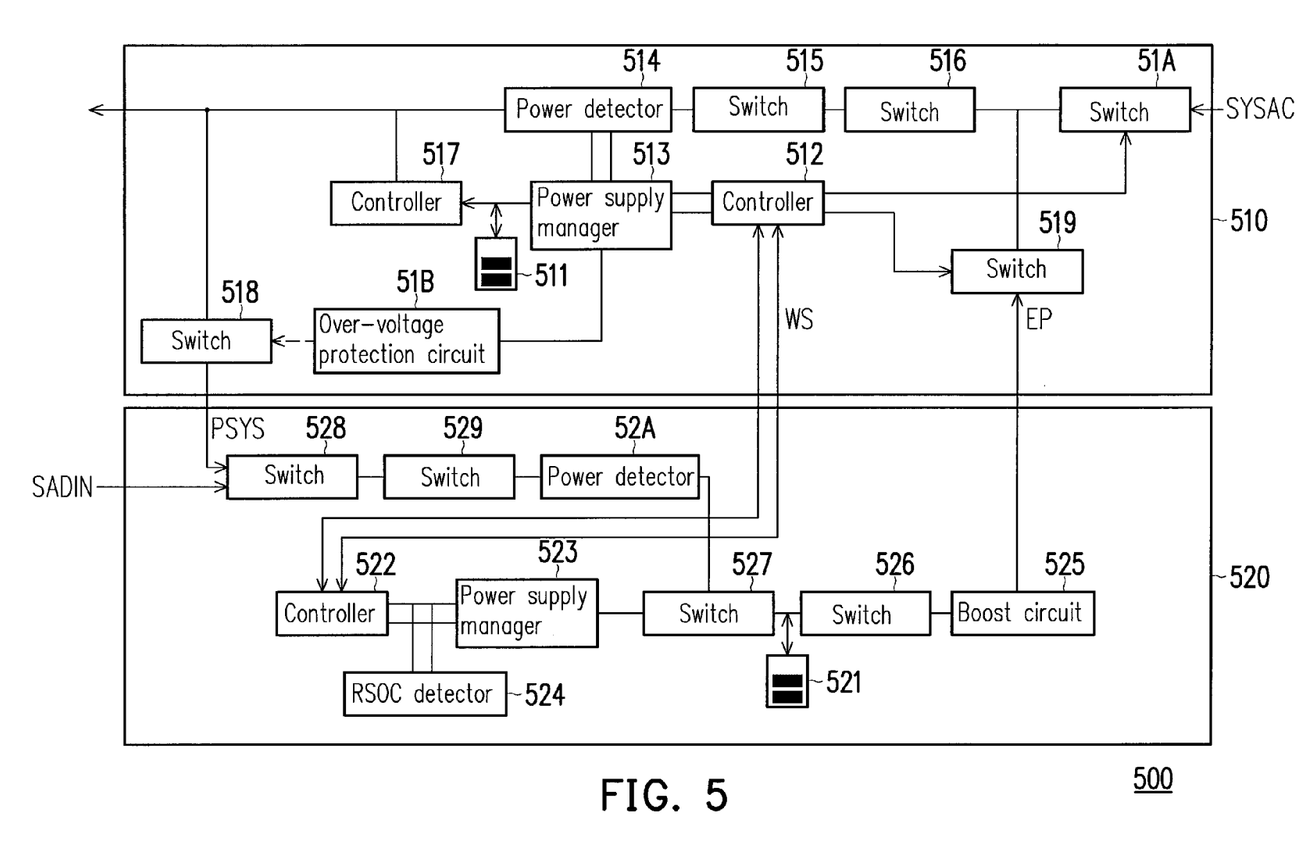
FIG. 5 is a schematic diagram of a portable electronic system 500 according to another embodiment of the invention.

Referring to FIG. 5, FIG. 5 is a schematic diagram of a portable electronic system 500 according to another embodiment of the invention. The portable electronic system 500 includes a portable host 510 and a portable power supply 520. The portable host 510 includes a main battery 511, a controller 512, a power supply manager 513, a power detector 514, switch 515-519 and 51A and an over-voltage protection circuit 51B. The portable power supply 520 includes a backup battery 521, a controller 522, a power supply manager 523, a RSOC detector 524, a boost circuit 525, switches 526-529 and a power detector 52A.

In the portable host 510, the controller 512 is coupled to the power supply manager 513. The portable host 510 receives the external power SYSAC, and controls the switch 51A through the controller 512 such that the power supply management 513 can receive the external power SYSAC and the external power SYSAC can charge the main battery 511 coupled to the power supply manager 513. Moreover, the controller 512 can turn on the switch 517 to provide the RSOC of the main battery 511 to serve as a system power PSYS, and provide the system power PSYS to the portable power supply 520.

Moreover, in the portable host 510, the power detector 514 is coupled to the power supply manager 513 and is used for detecting a power magnitude of the external power SYSAC in a transmission path connected to the main battery 511. The over-voltage protection circuit 51B is coupled to the power supply manager 513. When an over-voltage phenomenon occurs, the over-voltage protection circuit 51B turns off the switch 518 to cut off a path used for transmitting the system power PSYS to the portable power supply 520.

In the portable power supply 520, the controller 522 is coupled to the controller 512 of the portable host 510 through a connecting interface for transmitting a work state WS. Moreover, the controller 522 of the portable power supply 520 is coupled to the power supply manager 523 and the RSOC detector 524, and the power supply manager 534 is coupled to the backup battery 521. Here, the connecting interface between the portable host 510 and the portable power supply 520 can be any serial interface or parallel interface, for example, a system management bus (SMBUS).

Besides the system power PSYS provided by the portable host 510, the portable power supply 520 may further receive a backup external power SADIN. The system power PSYS and the backup external power SADIN can be transmitted to the backup battery 521 to charge the backup battery 521 through conduction of the switches 528 and 529.

Moreover, the RSOC of the backup battery 521 can be discharged through the switch 526 and transmitted to the boost circuit 525 to implement a boost operation. The boost circuit 525 generates a backup power EP according to the RSOC of the backup battery 521, and provides the backup power EP to the portable host 510. When the portable host 510 needs to receive the backup power EP, the controller 512 turns on the switch 519, such that the backup power EP is transmitted into the portable host 510. Conversely, when the portable host 510 does not need to receive the backup power EP, the controller 512 turns off the switch 519, such that the backup power EP cannot be transmitted into the portable host 510.

According to the above descriptions, it is known that in the portable host 510 and the portable power supply 520, the controllers 512 and 522 and the power supply managers 513 and 523 can turn on/off one or a plurality of switches to charge or discharge the main battery 511 and/or the backup battery 521. Moreover, the RSOC ratios of the main battery 511 and the backup battery 521 can be respectively obtained through the power supply managers 513 and 523.

In summary, charge or discharge of the main battery and the backup battery are controlled according to the work state of the portable electronic system transmitted to the portable host and the portable power supply, where the main battery and the backup battery are adaptively controlled in case that the portable host receives (does not receive) the external power, and in case of different RSOC stored in the main battery and the backup battery. In this way, the maximum efficiency of the main battery and the backup battery in the portable electronic system is achieved, which effectively enhances the endurance of the portable host.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A portable electronic system, comprising:
    a portable host, having a main battery and a connecting interface; and
    a portable power supply, having a backup battery, coupled to the portable host through the connecting interface, and transceiving a work state of the portable host and the portable power supply and a system power provided by the portable host through the connecting interface,
    wherein the portable host and the portable power supply control charge or discharge states of the main battery and the backup battery according to the work state, and the work state comprises relative state of charges (RSOC) of the main battery and the backup battery, information of whether the portable host is coupled to a power adaptor for receiving an external power, and information of whether the portable host is in a non-off mode or an off mode and whether the main battery and the backup battery synchronously charge or discharge,
    wherein when the portable host is not connected to the power adaptor, the main battery and the backup battery asynchronously charge or discharge, and the portable host is in the off mode, the portable host and the portable power supply make the main battery and the backup battery to discharge in alternation.

2. The portable electronic system as claimed in claim 1, wherein when the portable host is connected to the power adaptor to receive the external power, and the main battery and the backup battery asynchronously charge or discharge, the portable power supply and the portable host sequentially charge the main battery and the backup battery to make RSOC ratios of the main battery and the backup battery to be greater than a predetermined ratio.

3. The portable electronic system as claimed in claim 2, wherein when the portable host is connected to the power adaptor to receive the external power, the main battery and the backup battery asynchronously charge or discharge, and the RSOC ratios of the main battery and the backup battery are all greater than the predetermined ratio, the portable host and the portable power supply sequentially charge the main battery and the backup battery to make the RSOC ratios of the main battery and the backup battery to be equal to 100%.

4. The portable electronic system as claimed in claim 3, wherein the portable host and the portable power supply provide the external power and/or a RSOC of the backup battery to charge the main battery, and the portable host and the portable power supply provide the system power to charge the backup battery, wherein the system power comprises the external power and/or power provided by the main battery.

5. The portable electronic system as claimed in claim 1, wherein when the portable host is not connected to the power adaptor, and the main battery and the backup battery are changed to synchronously charge or discharge, the portable host and the portable power supply make the main battery to discharge to the backup battery or make the backup battery to discharge to the main battery.

6. The portable electronic system as claimed in claim 5, wherein the portable host and the portable power supply make the main battery to discharge to the backup battery when the RSOC ratio of the main battery is greater than a first predetermined value, and stop charging the backup battery when the RSOC ratio of the backup battery is greater than a second predetermined value.

7. The portable electronic system as claimed in claim 5, wherein the portable host and the portable power supply make the backup battery to discharge to the main battery when the RSOC ratio of the backup battery is greater than a first predetermined value, and stop charging the main battery when the RSOC ratio of the main battery is greater than a second predetermined value.

8. The portable electronic system as claimed in claim 1, wherein when the portable host is connected to the power adaptor to receive the external power, and the main battery and the backup battery synchronously charge or discharge, the portable host and the portable power supply synchronously charge the main battery and the backup battery through the external power.

9. The portable electronic system as claimed in claim 1, wherein when the portable host is not connected to the power adaptor, and the main battery and the backup battery synchronously charge or discharge, the portable power supply makes one of the backup battery and the main battery to discharge according to a priority setting, and after a RSOC of the discharged battery is less than a security RSOC limit, the portable host makes another one of the main battery and the backup battery to discharge.

10. The portable electronic system as claimed in claim 1, wherein the portable power supply comprises:
    a controller, coupled to the portable host through the connecting interface for transceiving the work state, and generating a charge or discharge control signal according to the work state; and
    a power supply manager, coupled to the controller and the backup battery, and controlling charging/discharging operations of the backup battery according to the charge or discharge control signal.

11. The portable electronic system as claimed in claim 10, wherein the portable power supply further receives a backup external power, and the power supply manager charges the backup battery according to the backup external power.

12. The portable electronic system as claimed in claim 1, wherein the portable host comprises:
    a controller, coupled to the portable power supply through the connecting interface for transceiving the work state, and generating a charge or discharge control signal according to the work state; and
    a power supply manager, coupled to the main battery and the controller, and controlling charging/discharging operations of the main battery according to the charge or discharge control signal.

13. A power management method, adapted to a portable electronic system, the power management method comprising:
    transceiving a work state of a portable host and a portable power supply through a connecting interface, wherein the portable host has a main battery, and the portable power supply has a backup battery; and
    controlling charge or discharge states of the main battery and the backup battery according to the work state,
    wherein the work state comprises a relative state of charges (RSOC) of the main battery and the backup battery, information of whether the portable host is coupled to a power adaptor for receiving an external power, and information of whether the portable host is in a non-off mode or an off mode and whether the main battery and the backup battery synchronously charge or discharge, wherein when the portable host is not connected to the power adaptor, the main battery and the backup battery asynchronously charge or discharge, and the portable host is in the off mode, the portable host and the portable power supply make the main battery and the backup battery to discharge in alternation.

14. The power management method as claimed in claim 13, wherein when the portable host is connected to the power adaptor to receive the external power, and the main battery and the backup battery asynchronously charge or discharge, the power management method comprises:

sequentially charging the main battery and the backup battery to make RSOC ratios of the main battery and the backup battery to be greater than a predetermined ratio.

15. The power management method as claimed in claim 14, wherein when the portable host is connected to the power adaptor to receive the external power, the main battery and the backup battery asynchronously charge or discharge, and the RSOC ratios of the main battery and the backup battery are all greater than the predetermined ratio, the power management method comprises:

sequentially charging the main battery and the backup battery to make the RSOC ratios of the main battery and the backup battery to be equal to 100%.

16. The power management method as claimed in claim 13, wherein when the portable host is not connected to the power adaptor, and the main battery and the backup battery are changed to synchronously charge or discharge, the power management method comprises:

making the main battery to discharge to the backup battery or making the backup battery to discharge to the main battery.

17. The power management method as claimed in claim 16, wherein the step of making the main battery to discharge to the backup battery comprises:

making the main battery to discharge to the backup battery when the RSOC ratio of the main battery is greater than a first predetermined value; and stopping charging the backup battery when the RSOC ratio of the backup battery is greater than a second predetermined value.

18. The power management method as claimed in claim 16, wherein the step of making the backup battery to discharge to the main battery comprises:

making the backup battery to discharge to the main battery when the RSOC ratio of the backup battery is greater than a first predetermined value; and stopping charging the main battery when the RSOC ratio of the main battery is greater than a second predetermined value.

19. The power management method as claimed in claim 13, wherein when the portable host is not connected to the power adaptor, the main battery and the backup battery asynchronously charge or discharge, and the portable host is in the non-off mode, the power management method comprises:

making the backup battery to discharge until the RSOC of the backup battery is less than a security RSOC limit, and making the main battery to discharge.

20. The power management method as claimed in claim 13, wherein when the portable host is connected to the power adaptor to receive the external power, and the main battery and the backup battery synchronously charge or discharge, the power management method comprises:

synchronously charging the main battery and the backup battery through the external power.

21. The power management method as claimed in claim 13, wherein when the portable host is not connected to the power adaptor, and the main battery and the backup battery synchronously charge or discharge, the power management method comprises:

making one of the backup battery and the main battery to discharge according to a priority setting; and making another one of the main battery and the backup battery to discharge after a RSOC of the discharged battery is less than a security RSOC limit.

22. A portable electronic system, comprising:

a portable host, having a main battery and a connecting interface; and a portable power supply, having a backup battery, coupled to the portable host through the connecting interface, and transceiving a work state of the portable host and the portable power supply and a system power provided by the portable host through the connecting interface, wherein the portable host and the portable power supply control charge or discharge states of the main battery and the backup battery according to the work state, and the work state comprises relative state of charges (RSOC) of the main battery and the backup battery, information of whether the portable host is coupled to a power adaptor for receiving an external power, and information of whether the portable host is in a non-off mode or an off mode and whether the main battery and the backup battery synchronously charge or discharge, wherein when the portable host is not connected to the power adaptor, the main battery and the backup battery asynchronously charge or discharge, and the portable host is in the non-off mode, the portable host and the portable power supply first make the backup battery to discharge until the RSOC of the backup battery is less than a security RSOC limit, and then make the main battery to discharge.

* * * * *